US005568727A

United States Patent [19]

Chung

[11] Patent Number: 5,568,727

[45] Date of Patent: Oct. 29, 1996

[54] STRAIGHT TRAVELLING APPARATUS FOR HEAVY CONSTRUCTION EQUIPMENT

[75] Inventor: Dae S. Chung, Pusan, Rep. of Korea

[73] Assignee: Samsung Heavy Industries Co., Ltd., Seoul, Rep. of Korea

[21] Appl. No.: 497,130

[22] Filed: Jun. 30, 1995

[30] Foreign Application Priority Data

Oct. 29, 1994 [KR] Rep. of Korea .................... 94-28044

[51] Int. Cl.$^{6}$ .................................... F16D 31/02

[52] U.S. Cl. .................................... 60/421

[58] Field of Search .................................... 60/421

[56] References Cited

U.S. PATENT DOCUMENTS 5,052,179 10/1991 Fujii .................................... 60/421

*Primary Examiner*—F. Daniel Lopez
*Attorney, Agent, or Firm*—Kenyon & Kenyon

[57] ABSTRACT

A straight travelling apparatus for heavy construction equipment such as excavator or crane, including a straight travel valve disposed in both lines respectively branching from first and second hydraulic pumps and switched between a first state at which a fluid delivered from the first hydraulic pump is supplied to a right travel motor and a part of the actuators of a working system while a fluid delivered from second hydraulic pump is supplied to a left travel motor and the remaining part of the actuators of the working system and a second state at which the fluid delivered from the first hydraulic pump is supplied to both the right and left travel motors while the fluid delivered from the second hydraulic pump is supplied to all actuators of the working system, first and second pilot fluid lines both branching from the pilot pump, a connecting fluid line adapted to communicate the first and second pilot fluid lines with each other, a fluid line branching from the connecting fluid line, and a relief check valve disposed at a predetermined position between a branching point where the fluid line branches from the connecting fluid line and a connecting point where the connecting fluid line is connected to the second pilot fluid line.

7 Claims, 3 Drawing Sheets

STRAIGHT TRAVELLING APPARATUS FOR HEAVY CONSTRUCTION EQUIPMENT

BACKGROUND OF THE INVENTION

1. Field of the Invention

The present invention relates to a straight travelling apparatus for heavy construction equipment, and more particularly to such an apparatus capable of continuously maintaining the straight travelling function of construction equipment such as excavators or cranes even when a working unit of the construction equipment is operated during movement of the construction equipment.

2. Description of the Prior Art

Generally, travelling construction equipment such as excavators and cranes are constructed to operate actuators (travel motors) of its travelling system and actuators (boom cylinder, arm cylinder, bucket cylinder and the like) of its working system use a flow of fluid delivered from a single pump.

Such a construction is illustrated in FIG. 1. As shown in the drawing, a first hydraulic pump P1 and a second hydraulic pump P2 both having the same displacement are provided to be driven by a single engine. The first hydraulic pump P1 serves to supply operating fluid for the right travel motor TR and actuators a, b, c and d of a working system whereas the second hydraulic pump P2 serves to supply operating fluid for a left travel motor TL and other actuators a', b' and c' of the working system.

Although the reference symbols TR and TL in FIG. 1 have been shown as respectively denoting the right travel motor-side control valve and the left travel motor-side control valve, they will be described as respectively corresponding to the right travel motor and the left travel motor in the following description for convenience. For the same purpose, the reference symbols a, b, c, d, a', b' and c' will be described as respectively corresponding to the actuators of working system in the following description, even though they have been shown as respectively denoting control valves of the actuators of the working system.

As the right and left travel motors TR and TL are driven after an activation of the engine in the conventional construction equipment having the above-mentioned construction, a flow of fluid delivered from the first hydraulic pump P1 is fed to the right travel motor TR via a fluid line connected between the first hydraulic pump P1 and the right travel motor TR while a flow of fluid delivered from the second hydraulic pump P2 is fed to the left travel motor TL via a fluid line connected between the second hydraulic pump P2 and the left travel motor TL. Accordingly, the construction equipment can travel straight because the first and second hydraulic pump P1 and P2 have the same displacement.

When at least one of the actuators of the working system is actuated under the condition that the construction equipment travels straight, for example, when the arm cylinder c' is supplied with the operating fluid to actuate an arm, the fluid flow delivered from the second hydraulic pump P2 is distributively fed to both the left travel motor TL and the arm cylinder c' via parallel fluid lines. As a result, the amount of fluid supplied to the left travel motor TL becomes less than the amount of fluid supplied to the right travel motor TR. This results in a failure to keep the the construction equipment travelling straight and thereby creating a left declination of the construction equipment.

Therefore, it is absolutely needed to provide a straight travelling device for avoiding unexpected declination of the construction equipment and keeping of the construction equipment travelling straight even when a working unit is operated during movement of the construction equipment.

Referring to FIG. 2, there is illustrated a conventional straight travelling device designed to achieve supply of operating fluid in a fashion that the first and second hydraulic pumps serve to independently supply fluid flows therefrom to the left and right travel motors when there aren't any working units being operated during movement of the construction equipment whereas when at least one working unit is being operated, one of them serves to supply its fluid flow to both the left and right travel motors while the other serves to supply its fluid flow to the working unit.

This will be described in more detail in conjunction with FIG. 2. Pilot oil delivered from a pilot pump P is distributively fed to a first pilot fluid line Pi1 and a second pilot fluid line Pi2. The first pilot fluid line Pi1 is designed to be connected to the main fluid line via inner fluid passages of selector valves s1 and s2 directly connected to respective control valves of the right and left travel motors TR and TL so that its pilot oil can drain into the main fluid line. On the other hand, the second pilot fluid line Pi2 is designed to be connected to the main fluid line via inner fluid passages of selector valves s3, s4, s5, s6, s7, s8 and s9 directly connected to respective control valves of all actuators a, b, c, d, a', b' and c' or the working system so that its pilot oil can drain into the main fluid line.

Each of the inner fluid passages of selector valves s3, s4, s5, s6, s7, s8 and s9 is designed in a fashion that it is opened in a neutral state of each associated actuator directly connected thereto and shut off during operation of the actuator. When either of the two actuators TR or TL of the travelling system operate, accordingly, the first pilot fluid line Pi1 increases in pressure. When any of the actuators a, b, c, d, a', b' and c' of the working system operates, the second pilot fluid line Pi2 increases in pressure.

When the first pilot fluid line Pi1 increases in pressure it is shut off at its drain side due to the operation of either of two actuator TR or TL of the travelling system.

The increased pressure of the first pilot fluid line Pi1 serves to move a spool of the flow switching valve 201 connected between the first pilot fluid line Pi1 and its drain side. By this movement, the second pilot fluid line Pi2 is communicated with a fluid line 202 which is a pilot fluid line for moving a spool of a valve 203 for straight travel. If any of the actuators a, b, c, d, a', b' and c' of the working system do not operate under the above-mentioned condition, the spool of the valve 203 for straight travel can not move against resilience of a valve spring 205 provided at the valve 203 because the pressure in the second pilot fluid line Pi2 is zero. In this case, accordingly, the straight travel valve 203 is maintained at its I-state. On the other hand, an operation of at least one of the actuators a, b, c, d, a', b' and c' of the working system results in shutting-off the second pilot fluid line Pi2 at its drain side and thereby increasing the pressure of the second pilot fluid line Pi2. The Increased pressure of the second pilot fluid line Pi2 is applied to the spool of the straight travel valve 203 via the fluid line 202 communicated with the second pilot fluid line Pi2, thereby causing the spool of the valve 203 to move against the resilience of the valve spring 205. As a result, the straight travel valve 203 is switched to its II-state.

However, if neither of the actuators TR nor TL of the travelling system operates under the condition that at least one of the actuators a. b, c, d, a', b' and c' of the working system is operating, then the straight travel valve 203 is still maintained at its I-state. This is because the fluid switching valve 201 is maintained at its shut-off state preventing communication between the second pilot fluid line Pi2 and the fluid line 202 when neither of the actuators TR nor TL of the travelling system is operating, thereby disabling the spool of straight travel valve 203 to move even though the operation of at least one actuator of the working system provides a sufficient pressure in the second pilot fluid line Pi2.

Under the condition that either actuator TR or TL of the travelling system and at least one of the actuators, a, b, c, d, a', b' or c' of the working system is operating in the II-state of the straight travel valve 203 in the above-mentioned conventional construction, accordingly, the fluid flow delivered from the first fluid pump P1 is supplied to both the right and left travel motors TR and TL of the travelling system while the fluid flow delivered from the second fluid pump P2 is supplied to the actuators a, b, c, d, a', b' and c' of the working system. Thus, the right and left travel motor TR and TL are always supplied with the same fluid amount irrespective of whether or not the working system is operating, thereby achieving the straight travelling function.

However, the conventional straight travelling device involves a problem that the construction of fluid lines and hydraulic elements added to achieve the straight travelling function is very complex. This results in an increased number of manufacturing and assembling steps and thereby difficulties in maintenance and repair. Moveover, the conventional device requires a large number of constituting elements and thereby an expensive manufacturing cost.

SUMMARY OF THE INVENTION

Therefore, an object of the invention is to provide a straight travelling apparatus for heavy construction equipment, capable of more effectively achieving its straight travelling function and yet having a simple construction.

In accordance with the present invention, this object is accomplished by providing a straight travelling apparatus for heavy construction equipment, connected to the hydraulic system of a heavy construction equipment, the hydraulic system including a pilot pump, first and second hydraulic pumps both having the same displacement, right and left travel motors activated by the hydraulic pumps, and a plurality of actuators of a working system, comprising: a straight travel valve disposed in both lines respectively branching from the first and second hydraulic pumps and switched between a first state at which a fluid delivered from the first hydraulic pump is supplied to the right travel motor and a part of the actuators of the working system while a fluid delivered from second hydraulic pump is supplied to the left travel motor and the remaining part of the actuators of the working system and a second state at which the fluid delivered from the first hydraulic pump is supplied to both the right and left travel motors while the fluid delivered from the second hydraulic pump is supplied to all actuators of the working system; a valve spring adapted to always urge the straight travel valve toward the first state; first and second pilot fluid lines both branching from the pilot pump, the first pilot fluid line draining its pilot fluid via selector valves directly connected to respective control valves of the right and left travel motors, and the second pilot fluid line draining its pilot fluid via selector valves directly connected to respective control valves of all actuators of the working system; a connecting fluid line adapted to communicate the first and second pilot fluid lines with each other; a fluid line branching from the connecting fluid line and communicating with a side of the straight travel valve opposite to the valve spring; a relief check valve disposed at a predetermined position between a branching point where the fluid line branches from the connecting fluid line and a connecting point where the connecting fluid line is connected to the second pilot fluid line; and another valve spring adapted to always urge the relief check valve toward a closed state.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
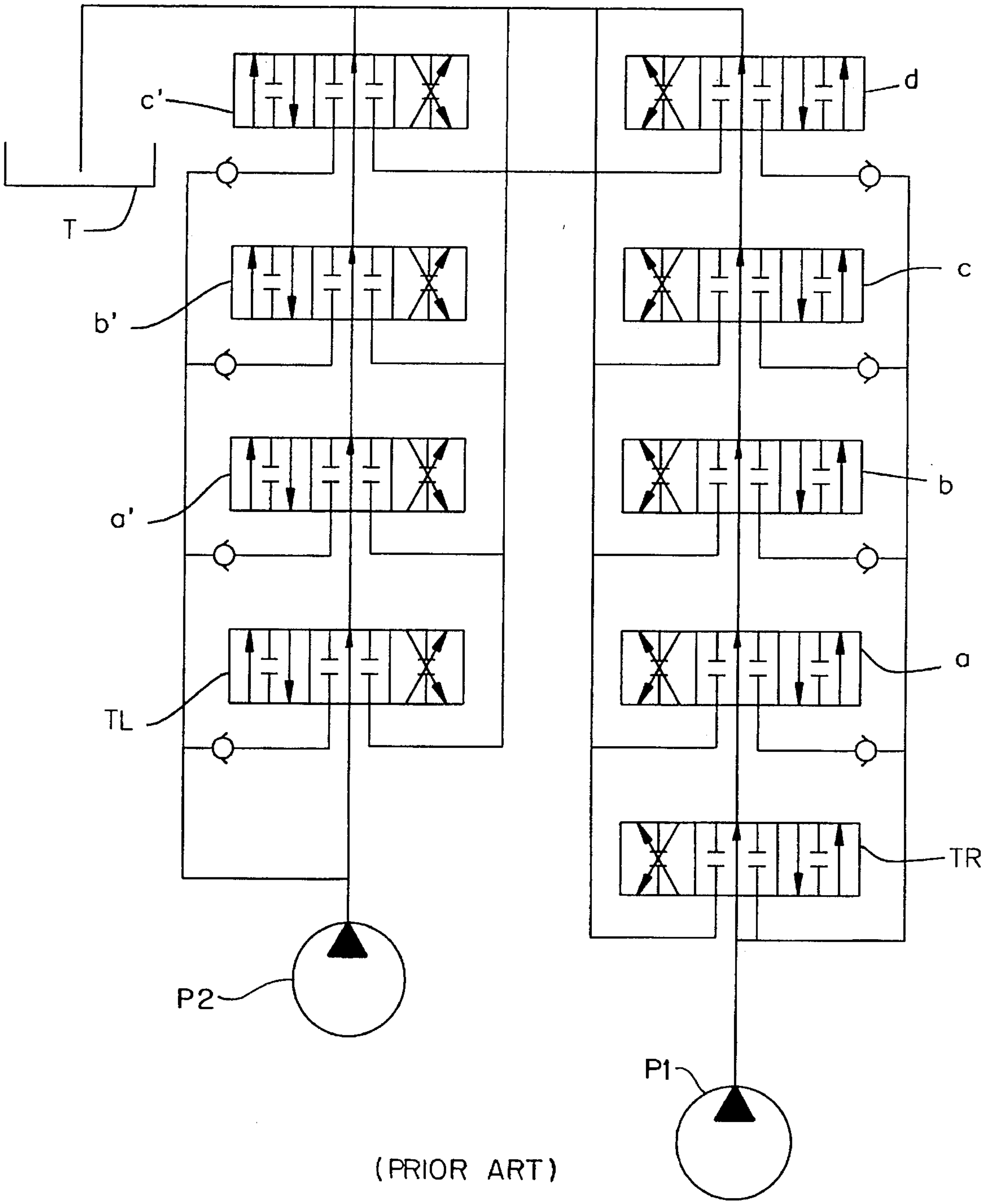
(PRIOR ART) FIG. 1
FIG. 1 is a circuit diagram of a conventional hydraulic circuit for heavy construction equipment.
Figure 2:
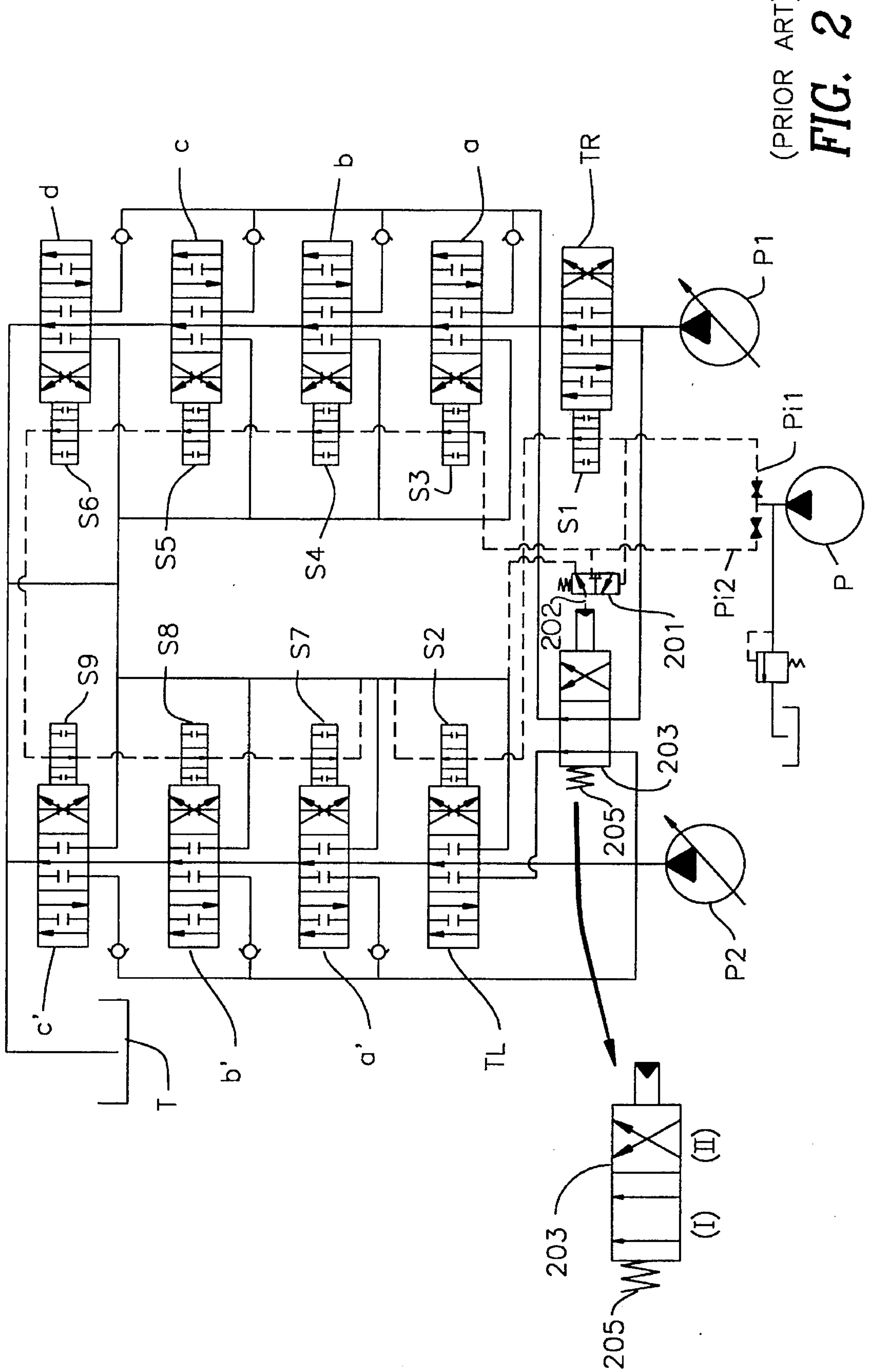
(PRIOR ART) FIG. 2
FIG. 2 is a circuit diagram of a hydraulic circuit for heavy construction equipment to which a conventional straight travelling device is applied.
Figure 3:
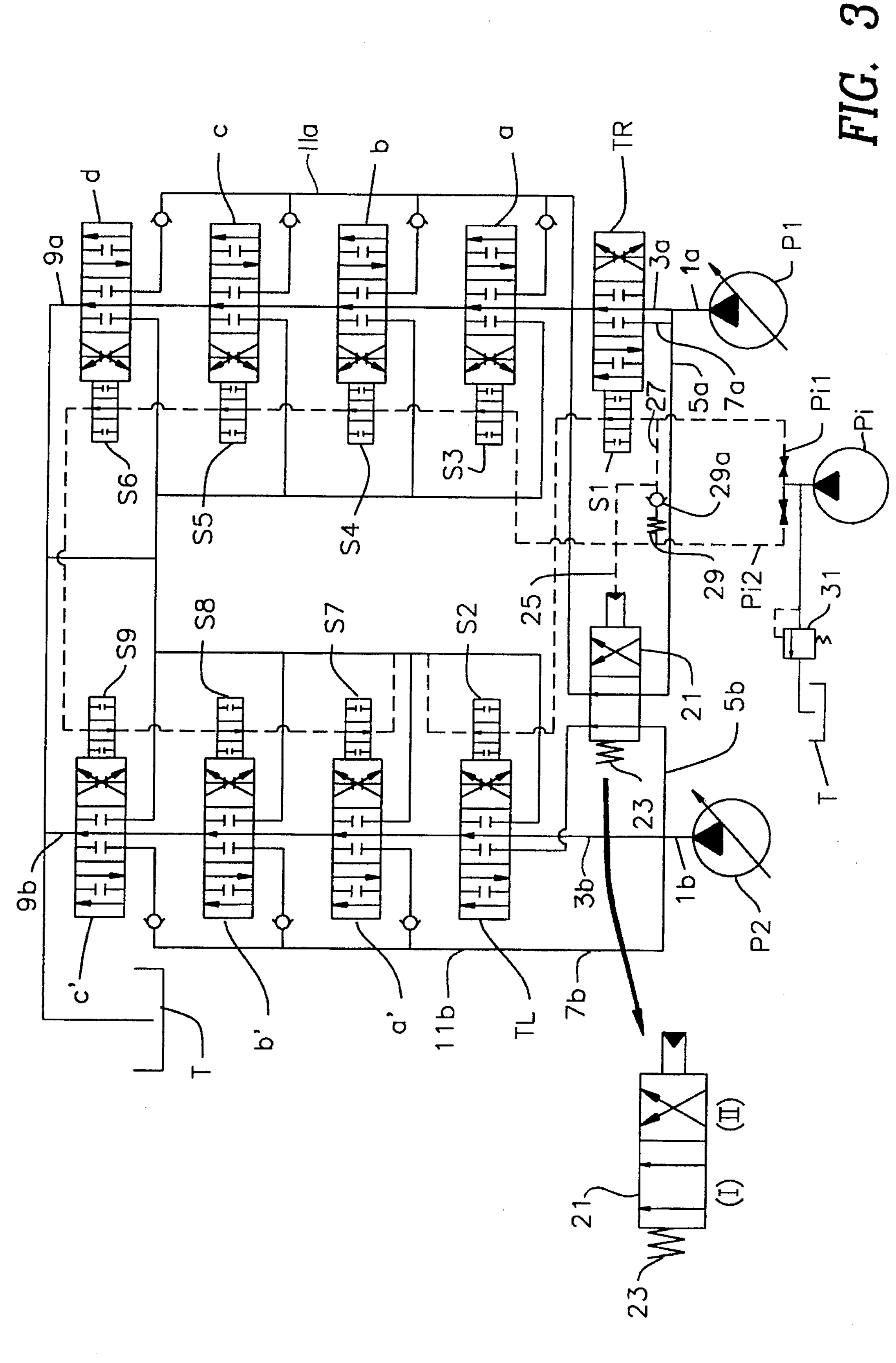
FIG. 3 is a circuit diagram of a hydraulic circuit for heavy construction equipment to which a straight travelling apparatus in accordance with an embodiment of the present invention is applied.

Referring to FIG. 3, there is schematically shown a hydraulic circuit for heavy construction equipment to which a straight travelling apparatus in accordance with an embodiment of the present invention is applied. In the following description relating to this embodiment, the basic construction of the hydraulic circuit shown in FIG. 3 and the operation thereof will be omitted because they have been described in conjunction with FIGS. 1 and 2. In FIG. 3, constituting elements respectively corresponding to those in FIGS. 1 and 2 are denoted by the same reference numerals.

As shown in FIG. 3, a first hydraulic pump P1 and a second hydraulic pump P2 both having the same displacement are provided to be driven by a single engine to supply operating fluid for two actuators of a travelling system, namely, right and left travel motors TR and TL and actuators a, b, c, d, a', b', and c' of a working system.

To the first hydraulic pump P1, a main fluid line *1a* is connected. The main fluid line *1a* is divided into a first branch fluid line *3a* and a second branch fluid line *5a*. A third branch fluid line *7a* branches from the second branch fluid line *5a*. The first branch fluid line *3a* communicates with a center bypass fluid line *9a* extending through a control valve of the right travel motor TR and control valves of the actuators a, b, c and d of the working system. The first branch fluid line *3a* drains its fluid into a tank T when all the control valves associated therewith are in a neutral state. On the other hand, the third branch fluid line *7a* communicates with the supply-side of the right travel motor TR. The second branch fluid line *5a* will be described hereinafter.

To the second hydraulic pump P2, a main fluid line *1b* is connected. The main fluid line *1b* is divided into a first branch fluid line *3b*, a second branch fluid line *5b* and a third branch fluid line *7b*. The first branch fluid line *3b* communicates with a center bypass fluid line *9b* extending through a control valve of the left travel motor TL and control valves of the actuators a', b' and c' of the working system. The first branch fluid line *3b* drains its fluid into the tank T when all the control valves associated therewith are in a neutral state. On the other hand, the third branch fluid line 7*b* communicates with parallel fluid lines 11*b* for the actuators a', b' and c' of the working system.

A straight travel valve 21, which is switched between a first state I and a second state II, is disposed in both the second branch fluid line 5*a* branching from the first hydraulic pump-side main fluid line 1*a* and the second branch fluid line 5*b* branching from the second hydraulic pump-side main fluid line 1*b*. The straight travel valve 21 is always urged toward a position corresponding to its first state I by a valve spring 23. When a pressurized fluid is applied to a fluid line 25 connected to a spool-side of the straight travel valve 21 opposite to the valve spring 23, it serves to urge the straight travel valve 21 toward a position corresponding to its second state II against the resilience of the valve spring 23. The procedure of applying the fluid pressure to the fluid line 25 will be described hereinafter.

During the first state I of the straight travel valve 21, the second branch fluid line 5*a* communicates with the parallel fluid lines 11*a* of the actuators a, b, c and d of the working system through an inner fluid passage of the straight travel valve 21. During the same state, the second branch fluid line 5*b* communicates with the supply side of the control valve of the left travel motor TL through another inner fluid passage of the straight travel valve 21. During the second state II of the straight travel valve 21, the second branch fluid line 5*a* communicates with the supply side of the control valve of the left travel motor TL through another inner fluid passage of the straight travel valve 21. During the second state II, the second branch fluid line 5*b* communicates with the parallel fluid lines 11*a* of the actuators a, b, c and d of the working system through another inner fluid passage of the straight travel valve 21.

During the first state I of the straight travel valve 21, accordingly, the first hydraulic pump P1 serves to supply an operating fluid to the right travel motor TR and the actuators a, b, c and d of the working system whereas the second hydraulic pump P2 serves to supply an operating fluid to the left travel motor TL and the actuators a', b' and c' of the working system. On the other hand, during the second state II of the straight travel valve 21, the first hydraulic pump P1 serves to supply operating fluid to the right and left travel motors TR and TL whereas the second hydraulic pump P2 serves to supply operating fluid to all actuators a, b, c, d, a', b' and c' of the working system.

In order to switch the straight travel valve 21 between the first and second states I and II, a pilot pump Pi and a pair of pilot fluid lines Pi1 and Pi2 are prodded. The pilot fluid lines Pi1 and Pi2 serve to sense whether or not any one of the actuators TR, TL, a, b, c, d, a', b' or c' is operating.

A pilot oil delivered from a pilot pump Pi is distributively fed to both the first pilot fluid line Pi1 and the second pilot fluid line Pi2. The first pilot fluid line Pi1 is designed to be connected to the main fluid line via inner fluid passages of selector valves s1 and s2 directly connected to respective control valves of the right and left travel motors TR and TL so that its pilot oil can drain into the main fluid line. On the other hand, the second pilot fluid line Pi2 is designed to be connected to the main fluid line via inner fluid passages of selector valves s3, s4, s5, s6, s7, s8 and s9 directly connected to respective control valves of all actuators a, b, c, d, a', b' and c' of the working system so that its pilot oil can drain into the main fluid line. Each of the inner fluid passages of selector valves s3, s4, s5, s6, s7, s8 and s9 is designed in a fashion that it is opened during the neutral state of each associated actuator directly connected thereto and shut off during the operating state of the actuator. If either actuator TR or TL of the travelling system is operating, accordingly, the first pilot fluid line Pi1 will increase in pressure. When any of the actuators a, b, c, d, a', b' or c' of the working system is operating, the second pilot fluid line Pi2 will increase in pressure.

The first and second pilot fluid lines Pi1 and Pi2 are connected to each other by a connecting fluid line 27 Just after branching from the pilot pump P1 (that is, before communicating with any of the selector valves s1, s2, s3, s4, s5, s6, s7, s8 or s9). The connecting fluid line 27 is connected at one end thereof to a predetermined point of the first pilot fluid line Pi1 disposed between the branching point at which the first and second pilot fluid lines Pi1 and Pi2 branch from the pilot pump Pi and a communication point at which the first pilot fluid line Pi1 communicates with the most upstream selector valve communicating therewith, namely, selector valve s1. The other end of the connecting fluid line 27 is connected to a predetermined point of the second pilot fluid line Pi2 disposed between the branching point at which the first and second pilot fluid lines Pi1 and Pi2 branch from the pilot pump Pi and a communicating point at which the second pilot fluid line Pi2 communicates with the most upstream selector communicating therewith, namely, selector valve s3. The connecting fluid line 27 also communicates with the fluid line 25. A relief check valve 29 is installed at an appropriate position in the connecting fluid line 27. The installation position of the relief check valve 29 in the connecting fluid line 27 corresponds to an optional point positioned between the connecting point at which the connecting fluid line 27 is connected to the fluid line 25 and the connecting point at which the connecting fluid line 27 is connected to the second pilot fluid line Pi2. The installation direction of the relief check valve 29 is determined such that when the fluid pressure in the connecting fluid line 27 is larger than the resilience of a valve spring 29*a* of the relief check valve 29, a flow of oil from the first pilot fluid line Pi1 to the second pilot fluid line Pi2 is allowed.

Preferably, the resilience of the valve spring 29*a* of relief check valve 29 is set to be relatively smaller than the resilience of the valve spring 23 of the straight travel valve 21.

In FIG. 3, the reference numeral 31 denotes a relief valve adapted to drain the oil delivered from the pilot pump Pi into the tank T when either of the pilot fluid lines Pi1 and Pi2 increases in pressure abnormally.

Operation of the straight travelling apparatus in accordance with the illustrated embodiment of the present invention will now be described.

In the case where either actuator TR or TL of the travellingsystem is operating:

(1) when none of the actuators a, b, c, d, a', b' and c' of the working system operates (that is, when the straight travelling function is unnecessary), the pilot oil pressure in the first pilot fluid line Pi1 increases whereas the pilot oil pressure in the second pilot fluid line Pi2 is zero. Accordingly, the pilot oil in the first pilot fluid line pi1 flows through the relief check valve 29 disposed in the connecting fluid line 27 against the resilience of the valve spring 29*a* of relief check valve 29. The pilot oil from the first pilot fluid line pi1 emerging from the relief check valve 29 enters the second pilot fluid line Pi2 and then drains into the tank T via the main fluid line. The pilot oil from the first pilot fluid line Pi1 also flows toward the fluid line 25 at the connecting point between the connecting fluid line 27 and the fluid line 25 before passing through the relief check valve 29, so that it applies its pressure to the spool-side of the straight travel valve 21 opposite to the valve spring 23. However, this pressure can not move the spool of the straight travel valve 21 at all because the resilience of the valve spring 23 of straight travel valve 21 is set to be relatively larger than the resilience of the valve spring 29*a* of relief check valve 29. As a result, the entire pilot oil flows toward the second pilot fluid line Pi2 through the relief check valve 29. Consequently, the straight travel valve 21 is continuously maintained in its first state I. Therefore, the fluid delivered from the first hydraulic pump P1 is supplied to the right travel motor TR and the actuators a, b, c and d of the working system whereas the fluid delivered from the second hydraulic pump P2 is supplied to the left travel motor TL and the actuators a', b' and c' of the working system.

(2) When any of the actuators a, b, c, d, a', b' or c' of the working system is operating (that is, when the straight travelling function is necessary), both the first and second pilot fluid lines Pi1 and Pi2 increase in pressure. In this case, the increased pilot oil pressure of the second pilot fluid line Pi2 is applied as a back pressure to the relief check valve 29, thereby preventing the relief check valve 29 from allowing the pilot oil in the first pilot fluid line Pi1 to pass therethrough. The pilot oil from the first pilot fluid line Pi1 then flows toward the fluid line 25 via the connecting point between the connecting fluid line 27 and the fluid line 25, thereby causing the spool of the straight travel valve 21 to move. As a result, the straight travel valve 21 is switched to its second state II. During the second state II of the straight travel valve 21, the fluid delivered from the first hydraulic pump P1 is supplied to both the right and left travel motors TR and TL via the straight travel valve 21 whereas the fluid delivered from the second hydraulic pump P2 is supplied to all actuators a, b, c, d, a', b' and c' of the working system via the straight travel valve 21. Consequently, the straight travelling apparatus keeps its straight travelling function even when the working unit operates during movement because both actuators TR and TL of the travelling system are receiving operating fluid from the same pump P1.

As apparent from the above description, the straight travelling apparatus in accordance with the present invention ensures the achievement of the straight travelling function when it is applied to various travelling construction equipments such as excavators and cranes by virtue of the greatly simplified fluid line arrangement thereof and the greatly reduced number of hydraulic elements thereof. Therefore, the straight travelling apparatus of the present invention greatly reduces the number of manufacturing and assembling steps and the manufacture cost. Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A straight travelling apparatus for heavy construction equipment, connected to a hydraulic system of the heavy construction equipment, the hydraulic system including a pilot pump, first and second hydraulic pumps both having the same displacement, right and left travel motors activated by the hydraulic pumps, and a plurality of actuators of a working system, comprising:

a straight travel valve disposed in both lines respectively branching from the first and second hydraulic pumps and switched between a first state at which a fluid delivered from the first hydraulic pump is supplied to the right travel motor and a part of the actuator of the working system while a fluid delivered from second hydraulic pump is supplied to the left travel motor and the remaining part of the actuators of the working system and a second state at which the fluid delivered from the first hydraulic pump is supplied to both the right and left travel motors while the fluid delivered from the second hydraulic pump is supplied to all actuators of the working system;

a valve spring adapted to always urge the straight travel valve toward the first state;

first and second pilot fluid lines both branching from the pilot pump, the first pilot fluid line draining its pilot fluid via selector valves directly connected to respective control valves of the right and left travel motors, and the second pilot fluid line draining its pilot fluid via selector valves directly connected to respective control valves of all actuators of the working system;

a connecting fluid line adapted to communicate the first and second pilot fluid lines with each other;

a fluid line branching from the connecting fluid line and communicating with a side of the straight travel valve opposite to the valve spring;

a relief check valve disposed at a predetermined position between a branching point where the fluid line branches from the connecting fluid line and a connecting point where the connecting fluid line is connected to the second pilot fluid line; and another valve spring adapted to always urge the relief check valve toward a closed state.

2. The straight travelling apparatus in accordance with claim 1, wherein each of the selector valves has an inner fluid passage which is opened at a neutral state of each associated actuator directly connected thereto and shut off at an operating state of the actuator.

3. The straight travelling apparatus in accordance with claim 1, wherein the connecting fluid line is connected at both ends thereof respectively to predetermined points of the pilot fluid lines each positioned upstream a communicating point where each corresponding pilot fluid line communicates with the most upstream one of the selector valves to be communicated therewith.

4. The straight travelling apparatus in accordance with claim 2, wherein the connecting fluid line is connected at both ends thereof respectively to predetermined points of the pilot fluid lines each positioned upstream a communicating point where each corresponding pilot fluid line communicates with the most upstream one of the selector valves to be communicated therewith.

5. The straight travelling apparatus in accordance with claim 1, wherein the valve spring for the relief check valve has a resilience set to be relatively smaller than that of the valve spring for the straight travel valve.

6. The straight travelling apparatus in accordance with claim 2, wherein the valve spring for the relief check valve has a resilience set to be relatively smaller than that of the valve spring for the straight travel valve.

7. The straight travelling apparatus in accordance with claim 3, wherein the valve spring for the relief check valve has a resilience set to be relatively smaller than that of the valve spring for the straight travel valve.

* * * * *

UNITED STATES PATENT AND TRADEMARK OFFICE

CERTIFICATE OF CORRECTION

PATENT NO. : 5,568,727

DATED : October 29, 1996

INVENTOR(S) : Dae S. Chung

It is certified that error appears in the above-identified patent and that said Letters Patent is hereby corrected as shown below:

Column 5, line 50, "prodded" should be -- provided --.

Column 6, line 53, "travellingsystem" should be --travelling system--.

Signed and Sealed this

Thirtieth Day of December, 1997

Attest:

Bruce Lehman

BRUCE LEHMAN

*Attesting Officer* *Commissioner of Patents and Trademarks*